Patented May 4, 1943

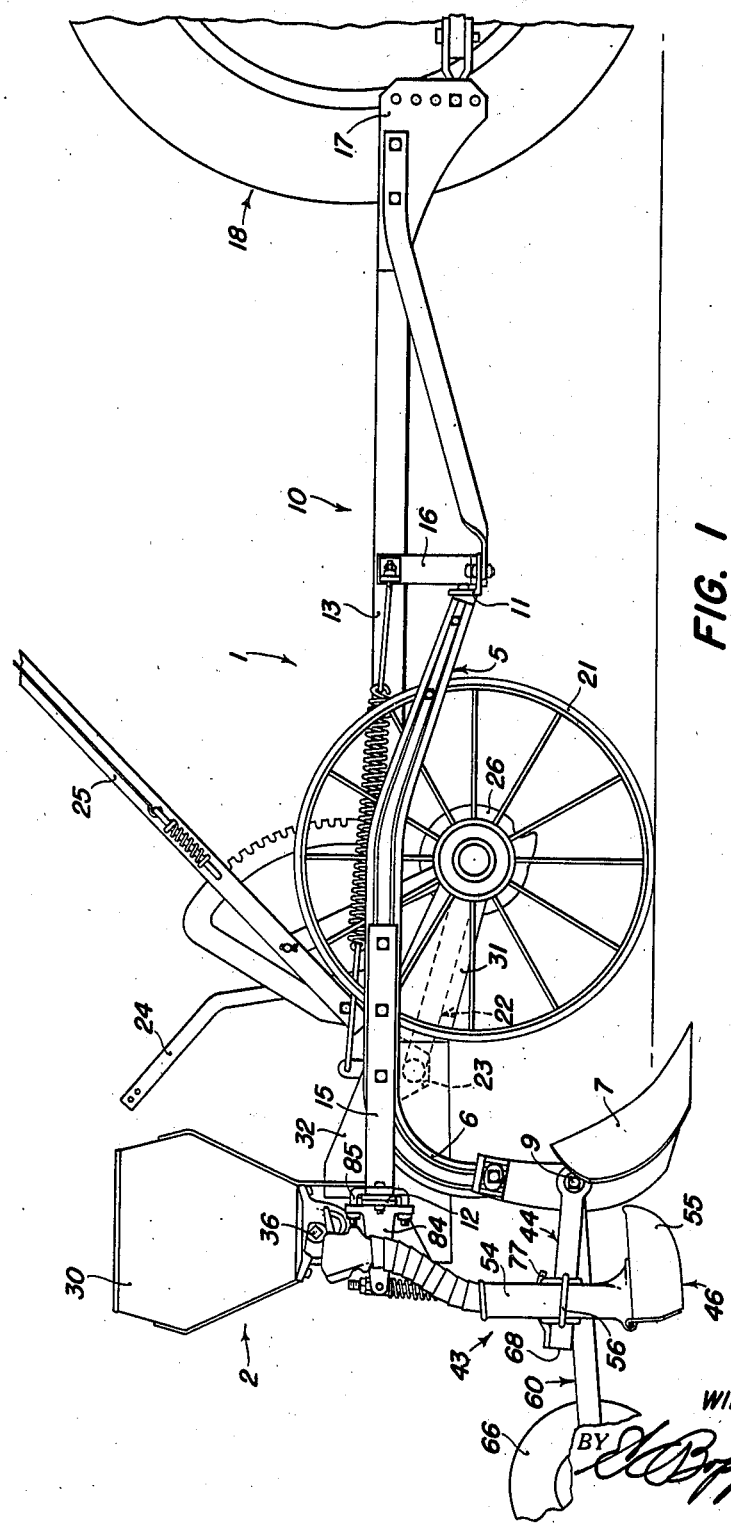

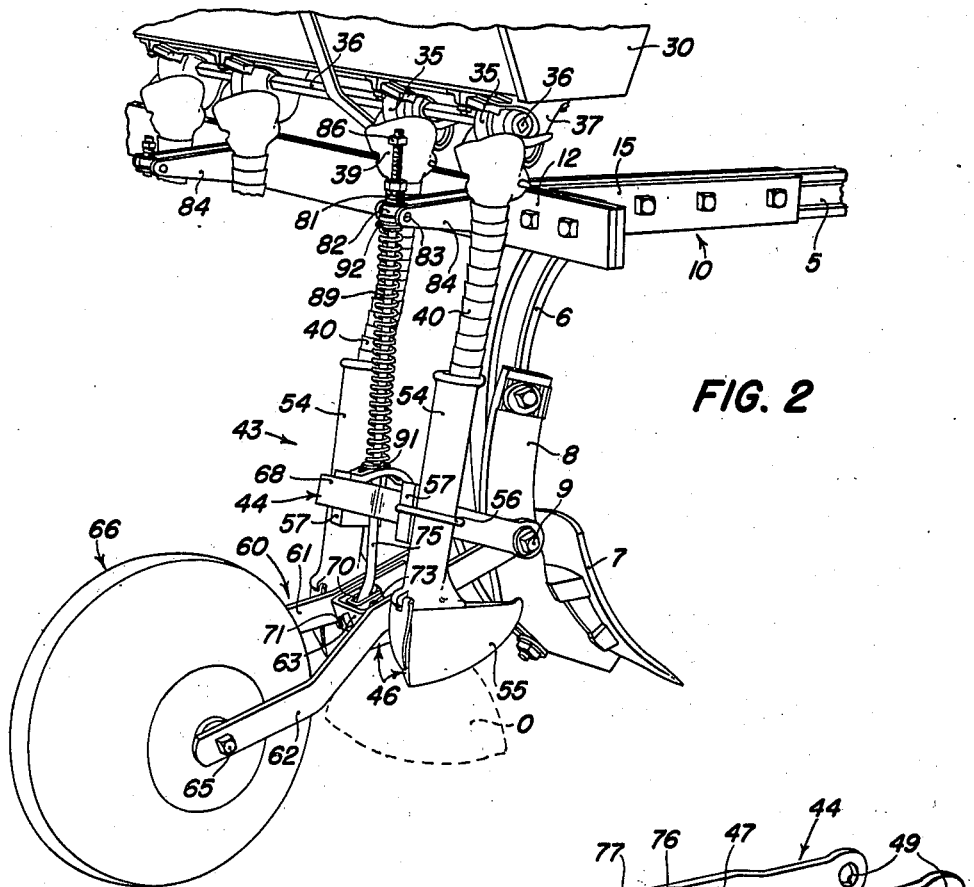
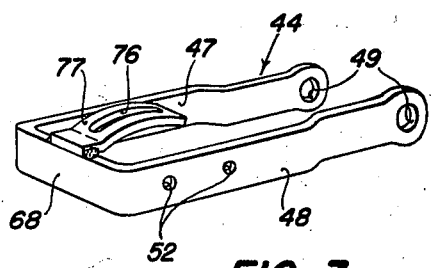
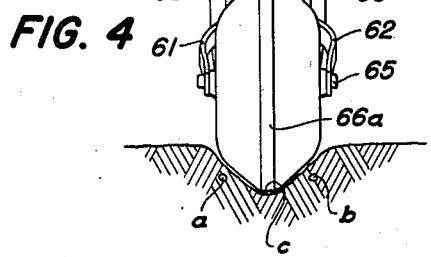

2,318,224

UNITED STATES PATENT OFFICE 2,318,224

LISTER

William A. Hyland, Horicon, Wis., assignor to Deere & Company, Moline, Ill., a corporation of Illinois Application April 8, 1940, Serial No. 328,470

19 Claims. (Cl. 111—83)

The present invention relates generally to agricultural implements and more particularly to planting implements utilized for depositing seeds in listed furrows.

The object and general nature of the present invention is the provision of a seeding attachment for listers in which ground engaging furrow openers and press wheels are employed and wherein the seed depositing furrow openers, while gauged normally in operation by the associated press wheels, are floatingly connected with the press wheel frames so that the furrow openers and associated parts are permitted to move upwardly relative to the press wheels and associated parts, thereby preventing breakage of the furrow openers and other parts if stones or other obstructions should be encountered by the furrow openers. More particularly, it is a feature of this invention to provide a furrow opener frame and a press wheel frame especially adapted to be connected to the downwardly extending or tool supporting section of the lister beam, and in such a manner that the furrow opener frame is permitted a certain amount of movement upwardly relative to the press wheel frame but wherein the latter serves to limit the downward movement of the furrow opener frame, thereby serving to gauge the operating depth of the furrow openers carried thereby.

Another feature of the present invention resides in the provision of lifting means which serves to lift the furrow openers through a connection with the press wheel frame, thereby facilitating upward movement of the furrow opener frame relative to the associated press wheel frame when obstructions are encountered. An additional feature of the present invention is the provision of yielding means normally holding the furrow opener frame down against the press wheel frame.

These and other objects and advantages of the present invention will be apparent to those skilled in the art after a consideration of the following detailed description of the preferred structural embodiment, taken in conjunction with the accompanying drawings.

In the drawings:

Figure 1 is a side view of a lister and seeding attachment therefor, in which the principles of the invention have been incorporated;

Figure 2 is a perspective view taken from a point laterally and rearwardly of the implement and showing certain details of the press wheel and planter furrow opener frames;

Figure 3 is a perspective view of the boot support or principal part of the furrow opener frame; and Figure 4 is a view looking directly forwardly toward one of the planting units, showing in particular the relation between the press wheel and the associated rows of seed.

Referring now more particularly to Figure 1, the lister on which the seeding attachment of the present invention has been mounted is indicated in its entirety by the reference numeral 1 and the seeding attachment is indicated in its entirety by the reference numeral 2. From Figure 1, which is a side view of the machine, it will be seen that the lister 1 is constructed generally along the lines of the lister shown in the Patent No. 1,813,207, which issued July 7, 1931, to Walter H. Silver, to which reference may be made if necessary. Briefly, the lister 1 includes a number of lister units disposed in transverse alignment, the number being immaterial so far as the present invention is concerned. Each lister unit includes a lister beam 5, the lower end of which extends downwardly to form a tool receiving section 6 and to which a lister tool 7 is fixed in any suitable manner, preferably by standards 8 pivoted, as at 9, to the tool supporting beam section 6. The several lister beams 5 are connected to, or form a part of, a main frame, indicated by the reference numeral 10, which comprises a transversely extending front frame bar 11 and a rear cross bar 12, together with two or more longitudinally extending frame bars 13. Preferably, the rear frame bar 12 consists of two bars bolted together for additional strength, and the rear portion of each lister beam 5 is secured by angle brackets 15 to the rear cross bar 12. The longitudinally extending frame bars 13 extend forwardly over the front frame bar 11 and angle brackets 16 are bolted to the sides of the longitudinal frame bars 13 and extend downwardly and are bolted to the horizontal flange of the front cross bar 11. The forward ends of the longitudinal frame bars 13 converge forwardly and receive a pair of hitch plates 17 by which the implement may be attached to a tractor, indicated generally at 18.

The lister 1 is provided with a pair of supporting wheels 21 which are journaled for rotation on the forwardly extending ends of a crank axle 22, the intermediate portion of which is mounted for rocking movement in brackets 23 suitably fixed to the intermediate lister beams 5. The crank axle 22 is rocked to raise and lower the frame relative to the supporting wheels by means of a half-revolution clutch mechanism 26 driven from the left hand ground wheel 21. The clutch trip lever is shown at 24, and the depth of operation is controlled by a hand lever 25 connected in the usual manner.

The seeding attachment unit 2 includes a seed box 30, the seed selecting and feeding mechanism of which is driven from the right hand ground wheel 21 by any suitable connection, such as sprocket and chain means within casings 31 and 32. The seed selecting and feeding mechanism, which may be of conventional construction, preferably comprises a plurality of pairs of double run feed wheels 35 driven by a seed shaft 36. Conventionally, the feed wheels 35 are mounted to rotate in feed cups 37, and the seed delivered by the wheels 35 are directed into the upper ends or spouts 39 of grain tubes 40.

The present invention is particularly concerned with certain new and useful improvements in the seed depositing and covering mechanism, which improvements will now be described.

Pairs of feed wheels and grain tubes are associated with each lister beam 5, 6 and a furrow opener unit indicated in its entirety by the reference numeral 43 is also pivotally connected to the tool receiving section 6 of each lister beam 5. The furrow opener unit 43 consists of a furrow opener frame 44 and a pair of furrow openers 46 supported thereby. Preferably, the frame 44 comprises a U-shaped member, best shown in Figure 3, which includes sides 47 and 48, each of which is apertured, as at 49, to receive the pivot bolt 9 (Figure 1) which extends laterally through the plates 8. The bolt 9 serves as a pivot connecting the furrow opener frame 44 with the lister beam for generally vertical swinging movement. Each of the furrow opener frame sides 47 and 48 is provided with a pair of openings 52, and each furrow opener 46 includes a generally vertically disposed seed boot or shank 54 and a furrow opener blade unit 55. A U-bolt 56 is disposed about each seed boot 54 and the ends of each U-bolt 56 extend through the associated pair of openings 52. Nuts on the ends of each U-bolt serve to adjustably fix the seed tube to the frame 44. A clamping plate 57 is disposed between each seed boot 54 and the adjacent portion of the furrow opener frame. Since each furrow opener is fixed to the side of the frame 44, it will be seen that each lister beam has swingably associated therewith a pair of laterally spaced furrow openers which receive seed, respectively, from the two pairs of seed tubes 40 associated therewith.

A press wheel frame 60 is also pivotally mounted on the tool receiving section 6 of each lister beam 5. The press wheel frame 60 consists of a pair of strap members 61 and 62 connected together by a U-shaped tie 63, bolted or otherwise secured to the strap members 61 and 62. At their forward ends the latter members are pivoted on the bolt 9, and at their rear ends the strap members 61 and 62 flare outwardly and are apertured to receive a bolt 65 which carries a bearing sleeve upon which a press wheel 66 is journaled for rotation. As best shown in Figure 1, the two sides of the furrow opener frame 44 are disposed outwardly of the adjacent portions of the press wheel frame 60, and the rear intermediate section 68 of the furrow opener frame 44 is disposed above the press wheel frame and normally engages the same. Normally, yieldable spring means is arranged to hold the furrow opener frame 44 down against the press wheel frame 60, whereby the press wheel 66 serves as a gauge for the operating position of the furrow openers 46. However, when the implement frame is raised to take the tools 7 out of the ground, both the press wheel and the furrow openers are also raised by connections which will now be described, together with the means for yieldingly holding the furrow opener frame down against the press wheel frame.

A clip 70 is bolted, as at 71, to the tie member 63 and carries a pin 73 that receives the eye of a pressure rod or link 75. The latter extends upwardly through a slot 76 (Figure 3) that is formed in a curved bracket 77 fixed or otherwise connected to the intermediate portion 68 of the furrow opener frame 44. At its upper end the pressure rod or link 75 extends slidably through a sleeve 81, the exterior of which is threaded. The sleeve 81 is adapted to be screwed to different positions in a nut member 82 mounted by trunnions 83 in the two rearwardly extending arms of a bracket 84. Each of the brackets 84 is fastened to the rear cross bar 12 by a U-bolt 85. A nut member 86 threaded onto the upper end of the rod or link 75 limits the downward movement of the rod in the threaded sleeve 81, and hence serves as a stop for the downward swinging movement of the press wheel 66 and associated parts.

A compression spring 89 is disposed about the rod or link 75 and bears at its lower end against a washer 91 resting on the curved bracket 77. At its upper end the spring 89 bears against a washer 92 which rests against the lower end of the threaded sleeve 81. Thus, the spring 89 serves to hold the furrow opener frame 44 down against the press wheel frame 60.

By virtue of the connections just described, whenever the crank axle 22 is swung downwardly, relative to the frame 10, either by the hand lever 25 or by some form of power lift associated with one of the ground wheels 21 and reacting against the lever 25, the upward movement of the frame 10 carries with it the rear cross bar 12, and the upward movement of the latter causes the several arms 84 to act through the pressure rods 75 to raise the associated press wheels and press wheel frames. Since the several furrow opener frames rest on the press wheel frames, by virtue of the pressure springs 89 holding the furrow opener frames down against the press wheel frames, both the press wheel and the furrow openers are raised whenever the frame 10 is raised to arrange the implement for transport.

When the frame is lowered, as in Figure 1, for operation, the spring 89 serves to hold both the press wheel and the furrow openers down in their operating position. If the furrow openers, or either one of them, should encounter an obstruction, the furrow opener frame 44, together with the associated furrow openers may swing upwardly against the tension of the spring 89, as indicated in Figure 2, independently of the position of the press wheel and its frame. In other words, the weight of the press wheel and the press wheel frame is not imposed upon the furrow openers. Instead, according to the present invention, they are permitted to float over stones and other obstructions, independent of the press wheels associated therewith. In Figure 2, the furrow openers are shown in a position they would occupy when an obstruction, such as is indicated by the reference character o, is encountered. After the machine moves forwardly the press wheel 66 will then encounter the obstruction o, and both the press wheel frame and the furrow opener frame will swing upwardly about the pivot 9 as the press wheel 66 passes over the obstruction.

The press wheel 66 is of the cast metal type provided with a rubber snap-on band or tread section, indicated by the reference numeral 66a, which is approximately V-shaped in section. The construction of the press wheel frame 60 and its mounting is such that the press wheel 66 travels generally in a vertical longitudinal plane that passes approximately midway between the two laterally spaced furrow openers 46 associated therewith. The V-shaped tread of the press wheel 66 serves the important purpose of firming the soil about the two rows of seed, as indicated at a and b in Figure 4. The wheel 66 also forms a trench c substantially midway between the two rows of seed and somewhat below the same. This, in effect, leaves the seed deposited on the side hill portions of the furrow and provides an opportunity for the seed when sprouting to push up through the soil along the sides of the trench if the bottom portion of which should be crusted as may occur if relatively heavy rains follow after the planting and before the seeds have come up.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A planting implement comprising a furrow opener unit, a press wheel unit, means connecting said units so that the furrow opener unit may move upwardly but is prevented from moving downwardly relative to the press wheel unit whereby the depth of operation of the furrow opener unit is gauged by said press wheel unit, and means connected with the press wheel unit for raising both of said units.

2. A planting implement comprising a furrow opener unit, a press wheel unit, means connecting said units so that the furrow opener unit may move upwardly but is prevented from moving downwardly relative to the press wheel unit whereby the depth of operation of the furrow opener unit is gauged by said press wheel unit, means connected with the press wheel unit for raising both of said units, and means resiliently opposing upward movement of said furrow opener unit in any position of said raising means, said resilient means yielding so as to accommodate generally upward movement of the planter furrow opener unit relative to the press wheel unit.

3. A planting implement comprising a planter furrow opener unit, a press wheel unit, a member connected with said press wheel unit and extending adjacent said furrow opener unit, and spring means encircling said member and operatively connected at its lower end with said planter furrow opener unit so as to bear thereagainst for yieldingly resisting movement of the latter relative to said press wheel unit.

4. A planting implement comprising a planter furrow opener unit, a press wheel frame unit movably connected therewith and arranged to limit the downward movement of the furrow opener unit relative to the press wheel frame unit, means normally holding the furrow opener unit against the downward limit of its movement relative to the press wheel frame unit whereby the latter determines the depth of planting, and means connected with said press wheel frame unit for simultaneously raising both units together.

5. A planting implement comprising a planter furrow opener, a press wheel frame movably connected therewith and serving to limit the downward movement of said furrow opener relative thereto, and spring means connected to yieldingly oppose upward movement of said furrow opener relative to said press wheel frame.

6. A planting implement comprising a furrow opener, a press wheel frame movably connected therewith and serving to limit the downward movement of the furrow opener relative to the press wheel frame, raising means operatively connected with said press wheel frame for raising both the latter and said furrow opener, and spring means extending between said furrow opener and said raising means for yieldingly opposing upward movement of the furrow opener relative to said press wheel frame in both raised and lowered positions thereof.

7. A planting implement comprising a tool supporting member, a press wheel frame pivoted thereto, a planter furrow opener unit also pivoted to said member and movable relative to said press wheel frame, means for raising said press wheel frame, and yielding means reacting against said raising means for resisting relative movement between said unit and said press wheel frame.

8. A planting implement comprising a tool supporting member having a tool, a press wheel frame pivotally connected thereto, a planter furrow opener unit also pivoted to said member and movable relative to said press wheel frame, said furrow opener unit and said press wheel frame being disposed behind said tool and said planter furrow opener unit including a part engageable with said press wheel frame for limiting the downward movement of said unit relative to said frame, means for raising said tool supporting member so as to raise both said furrow opener unit and said press wheel frame, and yielding means reacting against said supporting member for holding said furrow opener unit in operating position in engagement with said press wheel frame.

9. A planting implement comprising a tool supporting member, a planter furrow opener unit and a press wheel unit pivoted thereto for individual movement, said furrow opener unit being engageable with said press wheel unit whereby the latter limits the downward movement of the furrow opener unit, a lift arm connected with the upper portion of said tool supporting member, a link connecting said arm with said press wheel unit whereby said arm is adapted to raise both of said units, and spring means disposed between said arm and said furrow opener unit for yieldingly resisting upward movement of the latter relative to said press wheel unit.

10. A planting implement comprising support means, a pair of frames pivoted to said support means, one being disposed above and normally in engagement with the other, whereby the latter limits the downward movement of said one frame, means yieldingly holding said one frame against vertical movement relative to the other frame, and means to raise said support means so as to raise both of said frames.

11. A planting implement comprising a support member, a press wheel frame, a press wheel carried thereby, a furrow opener frame, means pivoting said frames to said support member with said furrow opener frame disposed over said press wheel frame and with a part at each side of the latter, and a pair of furrow openers fixed, respectively, to said parts laterally outwardly of said press wheel frame and adapted to engage the soil at opposite sides of the line of travel of said press wheel.

12. A planting implement comprising a tool supporting member, a generally U-shaped furrow opener frame pivoted to said tool supporting member for generally vertical swinging movement, a furrow opener fixed to each side of said U-shaped frame, a press wheel frame also pivoted to said tool supporting member and extending generally rearwardly between said furrow openers, and a press wheel journaled for rotation on said press wheel frame and adapted to be moved in a line between the seed deposited by the planter furrow openers.

13. A planting implement comprising a tool supporting member, a generally U-shaped furrow opener frame pivoted to said tool supporting member for generally vertical swinging movement, a furrow opener fixed to each side of said U-shaped frame, a press wheel frame also pivoted to said tool supporting member and extending generally rearwardly between said furrow openers, a press wheel journaled for rotation on said press wheel frame and adapted to be moved in a line between the seed deposited by the planter furrow openers, the intermediate portion of said planter furrow opener frame being disposed above and adapted to rest on said press wheel frame, and spring means yieldingly resisting upward swinging movement of said planter furrow opener frame away from said press wheel frame.

14. A seeding attachment for a lister having a tool beam, comprising a press wheel frame, a furrow opener frame, means adapted to pivotally connect said frames with said beam, said furrow opener frame having a portion engageable with said press wheel frame, lifting means adapted to be mounted on said beam, means operatively connecting said lifting means with said press wheel frame, and yielding means reacting against a fixed point on said tool beam for holding said furrow opener frame against said press wheel frame and accommodating upward movement of said furrow opener frame when the latter encounters an obstruction.

15. A seeding attachment for a lister having a lister beam, said lister beam terminating rearwardly in a downwardly directed tool supporting section, said seeding attachment comprising a press wheel frame and a planter furrow opener frame movably connected with the tool supporting section of said lister beam, a press wheel journaled for rotation on said press wheel frame, a pair of furrow openers fixed to said furrow opener frame at each side thereof, said furrow openers being disposed on opposite sides of the press wheel frame and including a part disposed above and normally resting against the press wheel frame, whereby the press wheel serves as a gauge for determining the operating depth of said furrow openers, an arm adapted to be fixed to said lister beam above the press wheel and furrow opener frame associated therewith, a link pivotally connected at its lower end to said press wheel frame and extending upwardly to said arm, and spring means extending between said arm and the furrow opener frame for yieldingly holding the latter in the position determined by the press wheel, said spring means yielding to permit the planter furrow opener frame and the two furrow openers connected therewith to move upwardly relative to the press wheel frame.

16. A seeding attachment as defined in claim 15, further characterized by means at the upper end of said link and reacting against the arm for limiting the downward movement of the press wheel frame relative to the lister beam, and means for adjusting the effective tension of the spring means.

17. A planting implement comprising a tool supporting member, a furrow opener frame pivoted to said tool supporting member for generally vertical swinging movement and including laterally spaced sections, a furrow opener fixed to each section, a press wheel frame also pivoted to said tool supporting member and extending generally rearwardly alongside said furrow openers, and a press wheel journaled for rotation on said press wheel frame and adapted to be moved in a line between the seed deposited by the planter furrow openers.

18. A planting implement comprising a tool supporting member, a furrow opener frame pivoted to said tool supporting member and including laterally spaced sections, a furrow opener fixed to each section, a link connected at its upper end with said tool supporting member and extending downwardly through said furrow opener frame, the latter being movable relative to said link, spring means surrounding the latter and reacting at its opposite ends against said tool supporting member and said furrow opener frame for yieldingly resisting upward movement of the latter, and an operating part connected with the lower end of said link, said furrow opener frame being movable relative to said operating part.

19. A planting implement comprising a furrow opener unit including a frame and furrow opening means, a press wheel unit, means connecting said units so that the furrow opener unit may move upwardly but is prevented from moving downwardly relative to the press wheel unit whereby the depth of operation of the furrow opener unit is gauged by said press wheel unit, and means adjustably fixing said furrow opening means to said furrow opener frame so as to dispose said furrow opening means in different positions relative to said press wheel unit when the latter serves to limit the downward movement of the furrow opener unit.

WILLIAM A. HYLAND.